Jan. 9, 1940.   C. E. KRAUS   2,186,417
CUTTER
Filed Dec. 19, 1939   5 Sheets-Sheet 1

INVENTOR
Charles E. Kraus
ATTORNEYS

Jan. 9, 1940.  C. E. KRAUS  2,186,417
CUTTER
Filed Dec. 19, 1939  5 Sheets-Sheet 2

Inventor
Charles E. Kraus
By Parker, Carlson, Pitzner & Hubbard
Attorneys

Jan. 9, 1940.   C. E. KRAUS   2,186,417
CUTTER
Filed Dec. 19, 1939   5 Sheets-Sheet 3

INVENTOR
Charles E. Kraus
By Parker, Carlson, Pitzner & Hubbard
ATTORNEYS

Fig. 12

Fig. 13
FOR 30° BEVEL

Fig. 14
FOR 45° BEVEL

Jan. 9, 1940. C. E. KRAUS 2,186,417
CUTTER
Filed Dec. 19, 1939 5 Sheets-Sheet 5

INVENTOR
Charles E. Kraus
By Parker, Carlson, Pitzner & Hubbard
ATTORNEYS

Patented Jan. 9, 1940

2,186,417

UNITED STATES PATENT OFFICE 2,186,417

CUTTER

Charles E. Kraus, Rockford, Ill., assignor to The Ingersoll Milling Machine Company, Rockford, Ill., a corporation of Illinois Application December 19, 1938, Serial No. 246,556

19 Claims. (Cl. 29—105)

This invention relates to a rotary cutter for removing a layer of metal from a work piece to form a smooth surface thereon during relative feeding movement between the rotating cutter and the work piece parallel to such surface. The invention has to do more particularly with cutters of this type in which the nose on each blade is beveled or set at an acute angle relative to the plane of rotation of the cutter to reduce the shock on the blades in entering the work and to prolong the tool life. Frequently, a series of bevels or a large radius on each blade nose are employed instead of a single straight bevel.

I have discovered that such beveling of the blades is accompanied by unexpected and extremely unfavorable changes in the cutting angles which are actually effective on the beveled portions of the edges where the major cutting action occurs. As a result, the cutting efficiency is reduced substantially, and in addition there is an objectionable increase in the end thrust on the cutter and a corresponding increase in the forces tending to distort the work and produce inaccuracy in the finished work surface.

The present invention is based on this discovery and its general aim is to provide a beveled blade metal removing cutter in which the position of each blade relative to the cutter body is correlated with the bevel on the blades in a novel manner such that the beveled edge portions act on the work at effective rake and shear angles which are proper for efficient cutting of the work material to be operated on.

Another object is to provide a cutter of the above character which not only overcomes the limitations inherent in beveled blade cutters heretofore used, but also enables the degree of blade beveling to be varied widely and actually utilizes the beveled character of the blades to perform new and advantageous functions including control of the thrust on the cutter during operation thereof and of the direction in which the chips are thrown.

A further object is to provide a cutter in which the active edges project shorter distances from the cutter body and therefore are supported more ruggedly than in prior cutters while at the same time providing for proper disposal of the chips.

The invention also aims to provide for operation of the main or bevel edges of the cutter at the proper effective cutting angles while at the same time maintaining proper rake and shear angles effective on the secondary cutting edges by which the finished work surface is determined.

Other objects and advantages of the invention will become apparent from the following detailed description taken in connection with the accompanying drawings, in which.

While the invention is susceptible of various modifications and alternative constructions and uses, I have shown in the drawings and will herein describe in detail one embodiment of the invention applied to face milling which is typical of the metal-removing processes in which the invention may be utilized. It is to be understood that I do not intend to limit the invention by such disclosure, but aim to cover all modifications and alternative constructions and uses falling within the spirit and scope of the invention as expressed in the appended claims.

Figure 15:
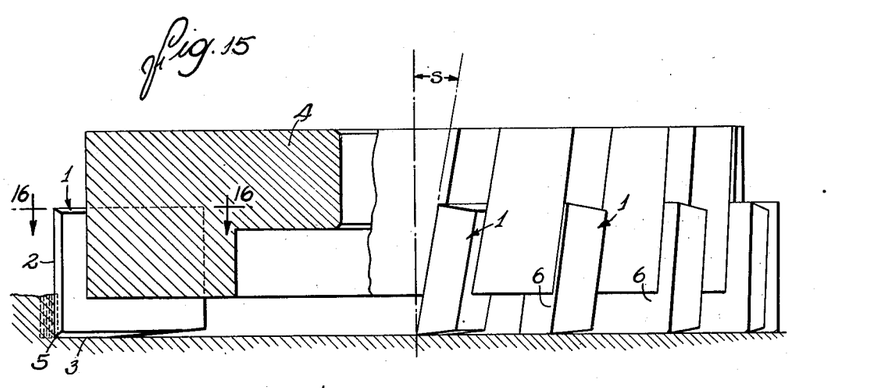
Fig. 15 is an elevational view of an ordinary face mill.

The discovery on which the present invention is based may best be explained by reference to Figs. 12 to 16. As shown in Fig. 15, the blades of an ordinary face mill are generally formed with side or main cutting edges 2 and face or finishing edges 3 which project from the periphery and end of the cutter body 4 and merge at a point or nose 5. Since the main cutting burden is on the edges 2, these are positioned to act at rake and shear angles $r$ and $s$ known to be most effective for cutting the metal on which the cutter is to operate. These angles are determined solely by the position of the leading or cutting face 6 on each blade relative to the cutter axis, the shear angle $s$ which is effective on the edge 2 being the angle of intersection between the cutter axis and the plane of the cutting face 6 (see Fig. 15). The rake of the edge 2 is the angle between said plane of the blade face 6 and a radius through the point 5 of intersection between the face and side edges 3 and 2 (see Fig. 16). This angle must of course be of positive sign, that is, the cutting face 6 must be displaced back of a radial line 7 through the cutting edge 2. Or in other words, the entire blade 1 is disposed behind a radius 8 of the cutter (see Fig. 16) parallel to the cutting face 6, this being a significant characteristic of ordinary face milling cutters.

Figure 12:
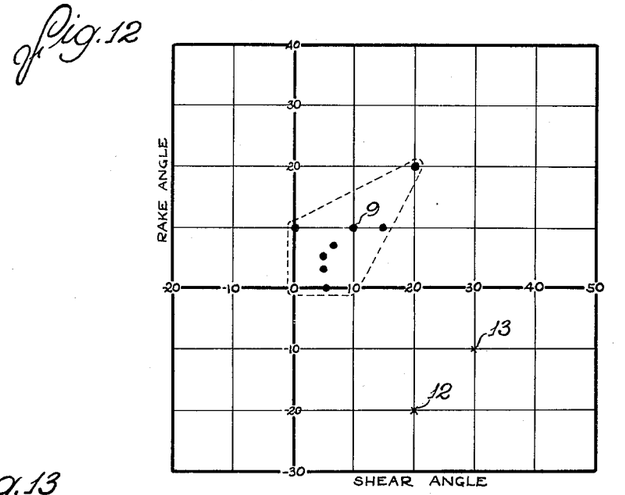
Fig. 12 is a chart showing the relation of apparent rake and shear angles.

The rake and shear angles employed will, of course, vary with different cutting and work materials, the approximate angles ordinarily employed for different kinds of cutters and materials being plotted in Fig. 12. It will be seen that most conventional cutters fall within the area enclosed by the dotted line in Fig. 12. Typical of such cutters is the one shown in Fig. 15 and indicated at 9 (Figs. 15 and 16) having 10 degree rake and shear angles effective on the edges 2. Such a cutter would be used for milling steel or cast iron using high speed steel blade edges.

Figure 19:
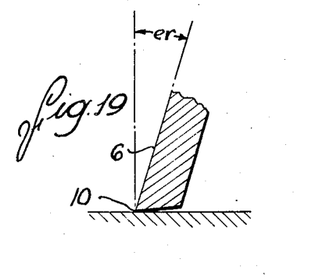
Figure 20:
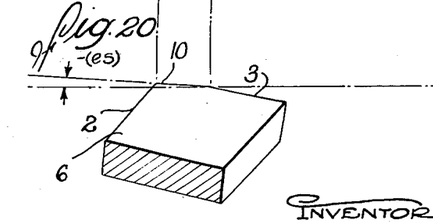
Fig. 20 is a view similar to Fig. 18 of a cutter having a smaller bevel angle.

For the purposes mentioned above, the blade tips 5 of cutters of the above character are frequently cut away to form cutting edge portions 10 (see Figs. 17 to 19) disposed at a bevel angle $b$ relative to the plane of rotation of the cutter. In such a cutter, the cutting efficiency is no longer determined by the rake and shear angles effective on the edges 2 but rather on those effective on the bevel edge portions 10 by which the main cutting action is produced. I have discovered that such beveling produces wide changes in the effective rake and shear angles at which the bevel portions 10 operate, and that the difficulties attending the use of beveled nose cutters are attributable to these changes. Thus, both the rake and shear angles $er$ and $es$ which are actually effective and the bevels will be determined not only by the position of the cutting face 6 which controls the apparent rake and shear angles as above described but also by the amount of the bevel. Assume, for example, that the face mill shown in Figs. 15 and 16 having blades positioned to provide an apparent rake angle $r$ and an apparent shear angle $s$ of 10 degrees on the side cutting edges 2 are beveled at an angle $b$ of 45 degrees which is common in practice. The effective angles in such a case may be determined from Fig. 14 wherein a chart showing effective angles for cutters with a 45 degree bevel angle is superimposed upon a chart of apparent rake angles. Thus, a cutter having apparent rake and shear angles of 10 degrees would fall at point 11. Reading from this point parallel to the effective rake and shear base lines, it will be found that the rake angle $er$ effective on the bevels 10 is increased to 17 degrees and that the effective shear angle $es$ is zero. If a smaller bevel angle is employed, the effective rake angle will be increased and the shear angle will not only be reduced materially but its sign will be changed. Thus, as shown in Fig. 20 and by the chart Fig. 13, the same cutter with a bevel angle of 30 degrees will produce a negative shear angle of four degrees. Such unfavorable angles obviously reduce the cutting efficiency. The shear is actually destroyed or reduced to an objectionable degree, and in cases where its sign is changed, the chips are caused to flow inwardly toward the cutter axis thereby necessitating greater chip clearances at the expense of body strength and blade rigidity. Also, the end thrust is increased materially and this results in a corresponding reduction in the accuracy of the finished work surface. In many instances, these difficulties more than offset the advantages of beveling the blade noses and place fixed limitations on the use of beveled cutters and on the amount of bevel which may be employed.

In one of its aspects, the present invention aims to overcome the detrimental action above referred to and to correlate the shape and position of the cutter blades with the bevel angle desired to be employed in a novel manner such that the beveled edge portions will operate on the work at effective shear and rake angles proper for the work material with which the cutter is to be used. Generally stated, this is accomplished by positioning the blades so that the apparent rake angle, which as set forth above is determined solely by the position of the cutting face of each blade relative to the cutter axis, is of negative sign and the apparent shear angle, which also is controlled by the cutting face position, is of the proper sign and magnitude to produce the desired effective rake and shear angles, the effective rake angle being of positive sign. That is to say, the apparent angles fall in the lower right hand quadrant of the charts Figs. 12 and 13 as indicated, for example, by the points 12 and 13 and to the right of the effective shear base line.

Figure 13:
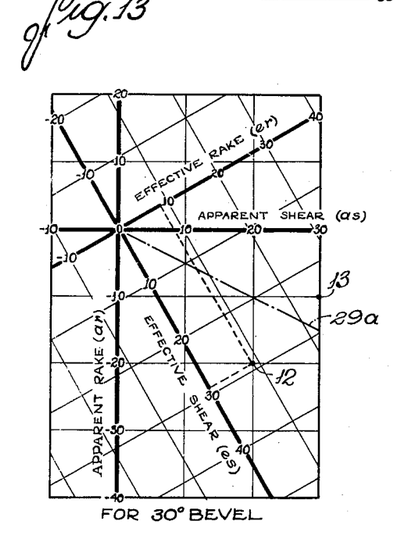
Figs. 13 and 14 are charts showing the relation of apparent and effective rake and shear angles in cutters having 30 and 45 degree bevel angles respectively.
Figure 14:
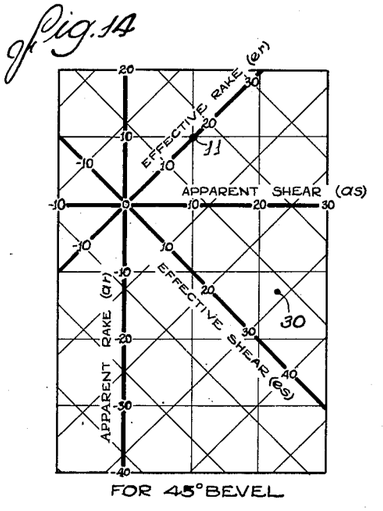

In another aspect, the invention also contemplates increasing the magnitudes of the shear and negative rake angles to such an extent that the effective shear angle is substantially greater than that required for efficient cutting but such as to control the end thrust on the cutter and the direction of chip flow. For example, for a cutter with blades of tungsten carbide and a 30 degree bevel angle for cutting cast iron and steel, an apparent negative rake angle of 20 degrees and a positive shear angle of 20 degrees would be desirable as indicated at 12 (Fig. 13). The beveled edge portions of such a cutter would act on the work with an effectice positive rake angle of 8 degrees and a shear angle of 29 degrees. Or, if high speed steel is employed, apparent rake and shear angles of 10 and 30 degrees would be used as indicated at 13 giving effective rake and shear angles both of 24 degrees. These are merely typical of the various angle combinations which might be employed depending on the cutting and work materials to be used and whether the cutter is to be used as a special or general purpose tool.

Referring now to Figs. 1 to 9, the cutter shown for purposes of illustrating the invention is of the inserted blade type having a body 15 intended to rotate about a central axis 16 and formed between its periphery 17 and its end face 18 with a frusto-conical surface 19 disposed at an angle corresponding to the bevel with which the cutter blades or teeth 20 are to be formed. The latter are received in slots 21 with an end portion projecting beyond the end and conical surfaces 18 and 19. The blades may be suitably wedged in the body slots or, if desired, they may be formed integral with the body. Preferably, they are fastened in place by a locking means (not shown) such as that forming the subject matter of Patent No. 2,173,868.

The flat leading or cutting face 22 of each blade 20 terminates in a side or peripheral edge portion 23 corresponding in position to the main cutting edge of an ordinary face mill, an end portion 24 disposed parallel to the plane of rotation of the cutter and defining an end cutting face that determines the finished work surface 29, and a bevel portion 25 which preferably is substantially straight and joins the portions 23 and 24 at a bevel angle $b$ of the desired magnitude. These beveled edges perform the main cutting action and cooperate to define a generally frusto-conical cutting face which has an axial height greater than the thickness of the metal layer 33 to be milled from the work. The blades are of course shaped to afford proper relief for the cutting edges and the body may be cut away as indicated at 26 to provide small chip clearance recesses immediately in advance of the bevel edge portions 25.

Figure 1:
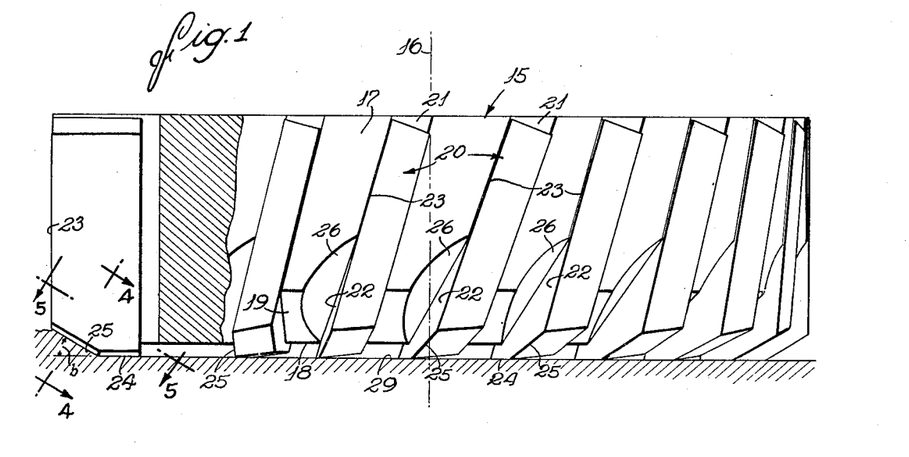
Figure 1 is a side elevational view of a face milling cutter embodying the novel features of the invention, the cutter being shown in operation on a work piece shown in section.
Figure 6:
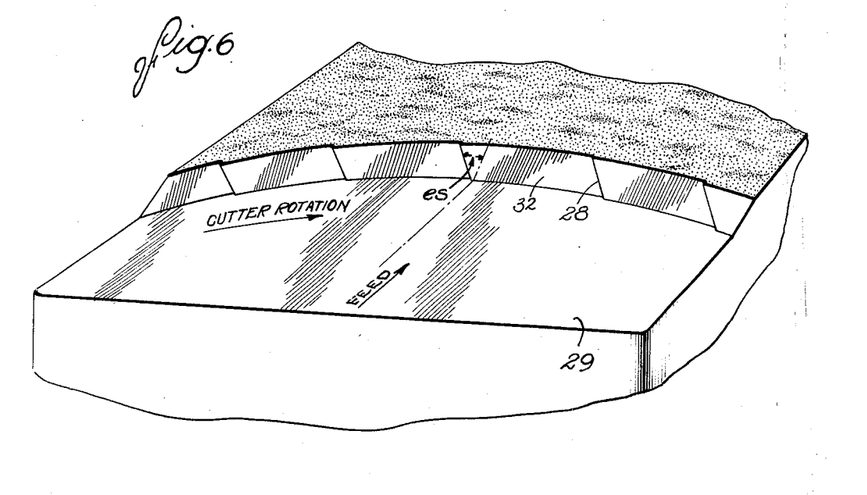
Fig. 6 is a fragmentary perspective view of a work piece in the course of milling the same by the improved cutter.
Figure 7:
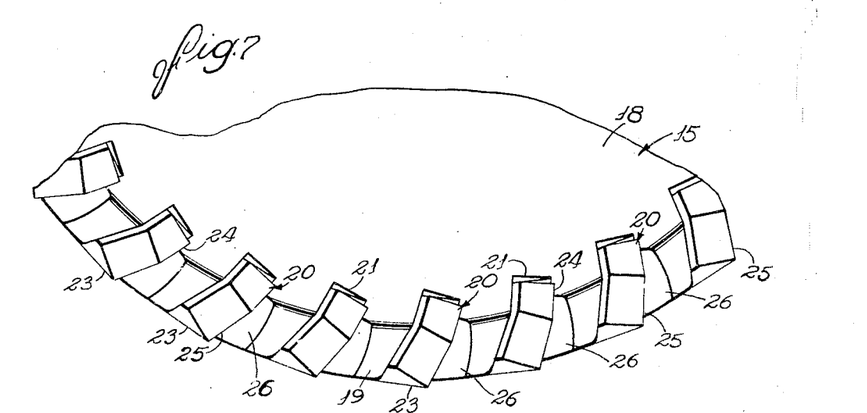
Fig. 7 is an end view of the cutter.
Figure 8:
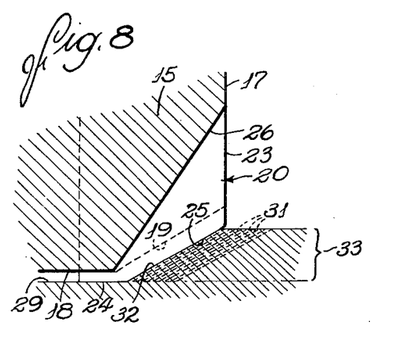
Fig. 8 is a fragmentary diametrical section through the cutter and a work piece.

The manner of using such a cutter to mill a layer 33 of metal from a work piece is illustrated in Figs. 1, 6, and 8. The cutter, disposed in a suitable machine tool with its end face coincident with the work surface 29 to be produced, is rotated about the axis 16 while being relatively fed along the finished surface in the directions indicated in Fig. 6. The bevel edges 25 cut through the work transversely of the direction of feed and remove successive chips or metal layers 31 (Fig. 8) along surfaces 32 inclined at the bevel angle to the finished surface. The edges 25 thus sustain the main cutting burden. The finishing edges 24 sweep across the work in the plane of the final surface and thus smooth off the zone machined by the main edges, thereby determining the position and finish of the final surface.

Figure 2:
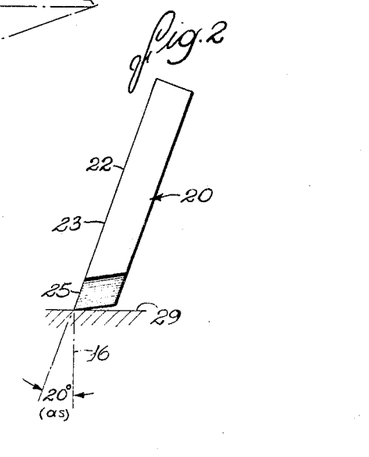
Fig. 2 is a side view of one of the cutter blades illustrating its position relative to the cutter body.
Figure 16:
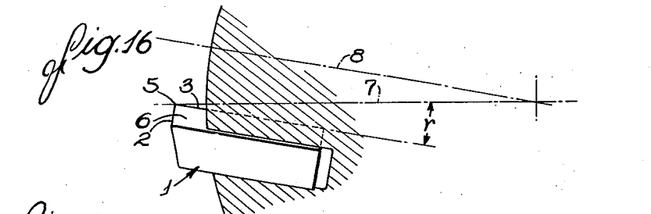
Fig. 16 is a fragmentary sectional view taken along the line 16—16 of Fig. 15.
Figure 17:
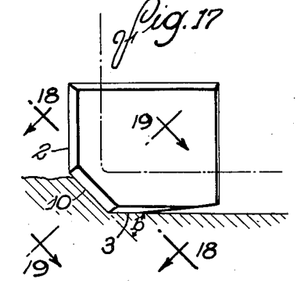
Fig. 17 is a fragmentary elevational view of the cutter shown in Fig. 15 with the blades beveled.

As set forth above, the apparent rake angle $ar$ of each blade is determined solely by the position of its front or cutting face 22 and is the angle which would be effective on the main cutting edges in the absence of the bevel. To establish a negative value for this angle as contemplated by the invention, each blade 20 is positioned in the body so that the inner end $24^a$ of the finishing edge portion 24 of the blade edge leads the outer end $24^b$ instead of trailing the outer end as in the case of an ordinary face milling cutter (Fig. 16). Otherwise stated, the plane of the cutting face 22 of the blade, which plane includes the edge 24, is disposed a substantial distance in advance of a radius 27 (Fig. 3) of the cutter parallel to the cutting edge instead of behind such a radius as in an ordinary face mill (Fig. 16). The apparent shear angle $as$ used is of the same sign as in an ordinary face mill, this being obtained by inclining the cutting face 22 of each blade at the correct angle upwardly and away from the cutter axis as illustrated in Fig. 2.

Figure 4:
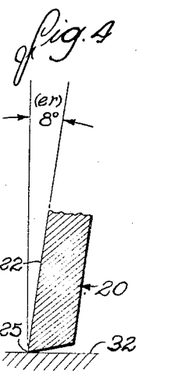
Figs. 4 and 5 are sectional views taken along the lines 4—4 and 5—5 of Fig. 1.
Figure 5:
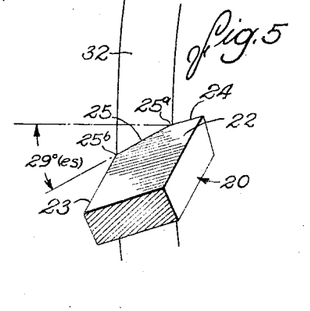

If, as in the cutter illustrated, the bevel angle $b$ is 30 degrees and the cutting faces 22 are positioned to produce a negative apparent rake angle $ar$ of 20 degrees combined with an apparent shear angle $as$ of 20 degrees, the rake angle $er$, which is actually effective on the beveled edge portion 25 during operation of the cutter, will be 8 degrees (Fig. 4), the angle being determined by following along the chart (Fig. 13) perpendicular to the effective rake base line from the point 12. As shown in Fig. 4, the sign of this effective rake angle will be positive because the cutting face 22 lies behind a perpendicular to the beveled work surface 32 through the edge 25. It will be observed that because of the bevel, the sign as well as the magnitude of the effective rake angle is influenced by the apparent shear angle as well as the apparent rake angle. As shown in Fig. 13, the effective rake will be of positive sign for combinations of apparent shear and negative rake angles which fall to the right of the effective shear base line. Also, the magnitude of the effective rake will be proportional to the magnitude of the apparent shear angle.

The sign of the shear angle is of special importance in the present instance. It is such that the inner end $25^a$ of the bevel edge portion 25, which end is disposed adjacent the finished work surface 29 during operation of the cutter, always leads the other or outer end $25^b$. That is to say, the inner end $25^a$ is the first part of the beveled edge to enter the work (see Fig. 9), the zone of engagement with the work progressing outwardly along the bevel so that after full entry into the work, the zone of engagement indicated at 28 (Fig. 6) extends along the beveled work surface 32 formed by the blade and upwardly and backwardly relative to the finished surface 2 and the direction of cutter rotation. With the blades thus located, the sign of the shear angle which is effective on the bevels 25 will be referred to herein as positive, being thereby distinguished from cases such as is shown in Fig. 20 where the outer end of the bevel leads the inner end.

The magnitude of the shear angle $es$ which is effective on the bevel edge portions 25 is also influenced by the size of the apparent rake angle $ar$. For angle combinations falling between the effective shear base line and a line $29^a$ (Fig. 13), the effective shear angle is larger than the apparent shear angle. As will appear later, the blades 20 are preferably located so as to produce a shear angle effective on the bevel edge portions 25 of fifteen degrees or more.

With negative apparent rake and positive apparent shear angles of 20 degrees as indicated by point 12 (Figs. 12 and 13), the effective shear on the bevel 25 would be 29 degrees. Thirty degrees apparent shear and ten degrees negative apparent rake as indicated at point 13 would produce 24 degrees positive effective rake and 24 degrees shear. Of course, the edge portions 25 may be set at any other bevel angle that may be desired, the position of the blades in the cutter body being correlated with the degree of bevel to produce effective rake and shear angles at least as large as those ordinarily used in practice considering the known characteristics of the work and cutting materials to be used. For example, with a 45 degree bevel angle which might be used in order to increase the permissible depth of cut, a positive rake angle of 8 degrees and an effective shear of 29 degrees would be obtained by employing apparent angles of 22 degrees shear and minus 13 degrees rake as indicated by the point 30 (Fig. 14) which compares with the point 12 (Fig. 13) for a 30 degree bevel.

In constructing a cutter in accordance with the present invention, the correct positions of blades are determined by first selecting the proper effective rake and shear angles which are of course controlled by the cutting material to be employed and the work material upon which the cutter is to operate. With these angles and the bevel angle known, the proper apparent angles may be calculated or ascertained from a chart of the character shown in Figs. 13 and 14. The blade slots 21 would then be located in the cutter body so as to position the cutting faces 22 of the blades at such apparent angles.

By thus selecting apparent rake and shear angles different from the effective angles desired and by correlating the magnitudes and signs of the apparent angles, not only with the desired effective angles but also with the amount of the bevel employed, the bevel edge portions 25 by which the major cutting action is produced may be made to act at angles most advantageous for efficient cutting with given work and cutting materials. For the same reason, no limitation is placed on the amount of the bevel, and the angle selected may be varied as desired to meet special operating conditions. Therefore, it is possible with the present invention to employ bevel angles much smaller than those heretofore used in practice. With a thirty degree bevel, for example, the width of the chips 31 (Figs. 8 and 9) may be doubled as compared to ordinary face milling practice thereby enabling the maximum permissible rate of feed to be increased correspondingly.

Since the magnitudes and signs of the effective rake and shear angles may be controlled as desired independently of each other and of the bevel angle, the beveled edge portions 25 may be utilized to advantage in performing additional advantageous functions. One of such functions is to control the direction of flow of the chips 31 in a manner such as to avoid the necessity of providing deep clearance grooves as is common in ordinary face milling practice. To this end, the effective shear angle es is made of positive sign and of sufficient magnitude to insure an outward chip flow and effective disposal of the chips.

Figure 3:
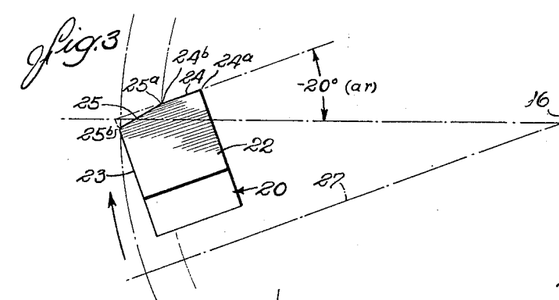
Fig. 3 is a plan view of the blade shown in Fig. 2.
Figure 9:
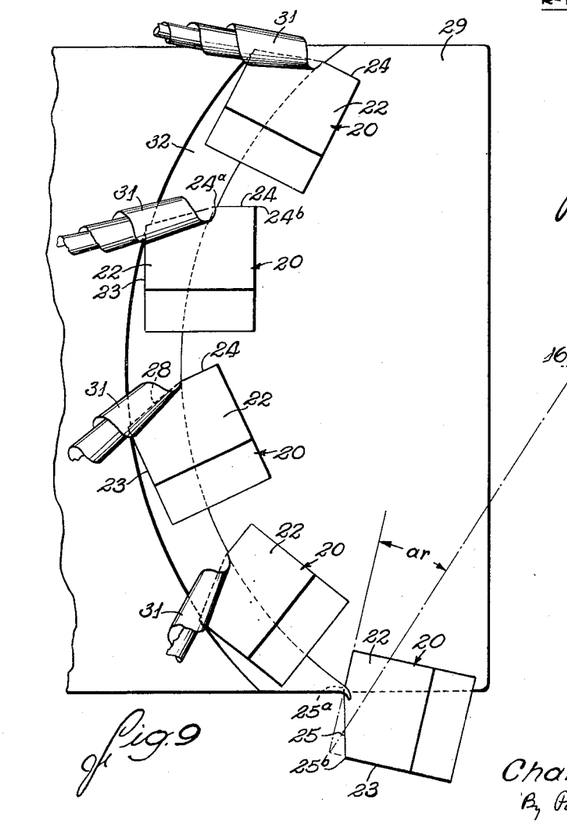
Fig. 9 is a fragmentary plan view of a work piece and cutter blades operating thereon showing the manner of chip flow.

To provide a shear angle of positive sign, the blades are positioned as above set forth with the inner end 25$^a$ of the beveled portion 25 leading the outer end 25$^b$ during rotation of the cutter (see Figs. 3 and 9). With a shear angle of this sign, the chip which is formed by each edge 25 is induced to flow outwardly and to take a spiral helical shape as illustrated in Fig. 9.

Figure 18:
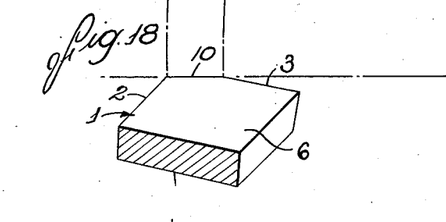
Figs. 18 and 19 are sections taken respectively along the lines 18—18 and 19—19 of Fig. 17.

In order to utilize advantageously this tendency of the chips to flow outwardly, the magnitude of the effective shear angle is increased to a value substantially above those ordinarily used in face milling practice. In the exemplary cutters described above, effective shear angles of 29 and 25 degrees are provided. These compare with shear angles of 15 degrees which are about the maximum ordinarily employed when machining steel or cast iron with ordinary face mills (Fig. 15) and with the much smaller and even reversed shear angles which are effective when such face mills are beveled (Figs. 18 and 20). With an effective shear angle of substantially more than 15 degrees, the chips 31 are thrown outwardly at a correspondingly large angle, and, in spite of any tendency to roll up as illustrated in Fig. 9, are thrown clear of the cutter body and out beyond the path of the cutter teeth regardless of the thickness of the metal layer being removed from the work. The necessity of providing wide and deep chip grooves between adjacent cutter teeth is thus avoided, thereby enabling the rigidity of the blade mounting to be increased proportionately. Accordingly, the blades 20 need not project beyond the periphery 17 of the cutter body and the conical surface 19 and end face 18 may be extended close to the blade edges 24 and 25. For example, as shown in Fig. 8, the edges 24 project beyond the cutter body a distance less than the total thickness of the metal layer 33 removed from the work and less than the vertical height of the frusto-conical cutting face defined by the beveled portions 25. By thus supporting the blades close to their active cutting edges, extreme rigidity of the mounting is obtained and blade chatter is reduced materially producing a smoother cutting action and prolonging the blade life.

Figure 10:
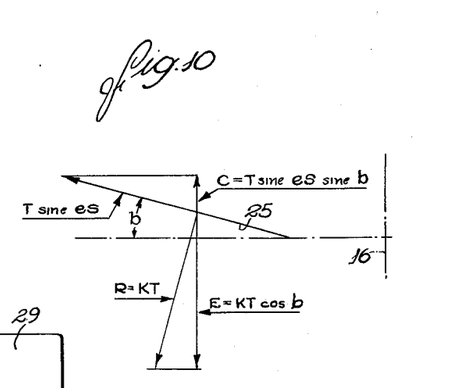
Figs. 10 and 11 are diagrams of the forces applied to the cutter during operation thereof.
Figure 11:
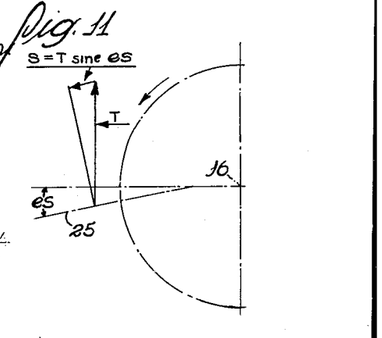

As pointed out above, the operation of any face mill having beveled blades is accompanied by the application of a substantial end thrust on the cutter and an equal distorting force on the work. This end thrust indicated at E is inversely proportional to the magnitude of the angle $b$ at which the bevel blade edges 25 are disposed as will be apparent from the force diagrams (Figs. 10 and 11). Thus each cutter blade 30 is subjected to a tangential force T and a so-called radial force R which latter force is, in the case of the beveled edge 25, directed downwardly at right angles to the cutting edge 25. As is well understood in the art, this radial force R may be expressed as a function K of the tangential force T, K being a constant determined mainly by the rake angle employed and the work material being cut and being on the order of .3 for soft steel, .4 for hard steel, and .5 for cast iron. Accordingly, the vertical component of the force R and therefore the end thrust E on the cutter is equal to KT cosine $b$. It will thus be seen that the end thrust increases as the bevel angle decreases. This accounts for the fact that bevel angles of less than forty-five degrees are seldom used in practice.

Owing to the shear angle es at which the beveled edge portions 25 act on the work, a side force S is exerted on each cutter blade, this being a component of the tangential force T and directed longitudinally of each edge portion 25. The magnitude of this side force is T sine es. With the blades positioned as above described to produce an effective shear angle of positive sign, the side force S will be directed outwardly along the blade edge 25 and will have an upwardly directed component C opposing the end thrust E which, as explained above, is due to the bevel angle $b$. The magnitude of the component C is equal to T sine es sine $b$.

From the foregoing, it follows that by employing an effective shear angle es of the proper sign and of sufficiently high magnitude, any proportion of the objectionable end thrust due to beveling of the cutter may be counteracted. Equating T sine es sine $b$ with KT cos $b$, it will be seen that the end thrust E will be overcome when sine es$=$K cot $b$. For example, if the value of K is .3 and the bevel angle is 30 degrees, the end thrust on the cutter may be reduced to zero by increasing the effective shear angle to 30 degrees. Or for a 45 degree bevel and with K equal to .4, the thrust due to the bevel would be neutralized at an effective shear angle of approximately 24 degrees and a major portion of the thrust will be counteracted with a positive effective shear of more than fifteen degrees.

By employing a relatively high shear angle and correlating the magnitude thereof with the degree of bevel desired, the thrust on the cutter due to beveling of the main cutting edges may be controlled. Therefore, bevel angles substantially smaller than those heretofore used in practice may be employed without the usual attending difficulties.

The use of a negative apparent rake angle and a shear angle of substantial magnitude for the purposes set forth above does not impair the cutting efficiency of the auxiliary edges 24 which clean up the work and determine the finished work surface 29. Such edges, of course, act at a rake angle equal to the apparent shear angle of the main cutting edges 25, this being of positive sign as is evident from the inclination of the blade face 22 (Fig. 2) by which the apparent angles are determined. Likewise, the apparent rake angle of the main cutting edge, as previously defined, is the effective shear angle of the finishing edge 24. Owing to the negative sign of the apparent rake angle, the outer end 25ª leads the inner end of the edge 24 (see Fig. 3). Thus, a shear angle of positive sign is effective on the finishing edge 24 so that this edge actually assists the main or bevel edge portions 25 in directing the flow of chips away from the cutter body. For example, with the teeth of the cutter positioned to provide an apparent negative rake angle of thirteen degrees and an apparent shear angle of twenty-two degrees, as indicated at point 30 (Fig. 14), the finishing edges 24 would act at a positive rake angle of twenty-two degrees and a positive shear angle of thirteen degrees. The use of such a relatively high rake angle is permissible because of the comparatively low cutting burden on the finishing edge portions 24.

From the foregoing, it will be seen that the present invention not only overcomes the objections to prior cutters having beveled main cutting edges but actually utilizes the inherent characteristics of such edges to produce new and advantageous functions. The invention provides for optimum cutting efficiency by enabling the proper rake and shear angles to be made effective for any given bevel. The degree of bevel may be varied as desired. By controlling the flow of chips, the rigidity of the blade mounting is increased materially resulting in smoother cutting action and longer tool life. Finally, the magnitude of the distorting forces on the work may be reduced to any desired degree. These advantageous characteristics have been established in actual service use of the improved cutter.

I claim as my invention:

1. A cutter having a rotary body, a plurality of teeth projecting therefrom and having substantially straight cutting edges defining a generally frusto-conical main cutting face, the leading face of each tooth being disposed at a negative rake angle and a shear angle correlated with each other and of sufficient magnitude to produce a positive rake angle and a sheer angle of more than fifteen degrees effective on said cutting edges during operation of the cutter, and secondary cutting edges on said teeth determining the work surface finished by the cutter.

2. A face milling cutter comprising a rotary body and a plurality of teeth projecting therefrom and having end edges defining an end cutting face parallel to the plane of rotation of the cutter and side edges defining a generally frusto-conical cutting face, each of said end edges being disposed with its inner end ahead of its outer end and each of said side edges being positioned to act at an effective shear angle of more than fifteen degrees.

3. A milling cutter for removing a layer of metal from a work piece to form a smooth surface thereon by relative feeding movement between the rotating cutter and the work piece parallel to said surface, said cutter having a rotary body, a plurality of teeth projecting therefrom and having substantially straight cutting edges defining a generally frusto-conical main cutting face, each tooth being disposed with its leading face ahead of a radius of the cutter extending parallel to the plane of such face whereby to produce a negative apparent rake angle but a positive rake angle effective on said cutting edges, and second cutting edges on said teeth acting during operation of the cutter to smooth off the zone of the work machined by said main face.

4. A cutter for removing a layer of metal from a work piece to form a smooth finished surface thereon by relative feeding movement between the rotating cutter and the work piece parallel to said surface, said cutter having a rotary body and a plurality of teeth projecting therefrom and each having one cutting edge determining said finished work surface and a second cutting edge set at an acute bevel angle relative to said first edge, said second edges being positioned to act at effective shear angles of at least twenty degrees and each having the end adjacent said first edge positioned to lead the other end during rotation of the cutter.

5. A cutter for removing a layer of metal from a work piece to form a smooth surface thereon by relative feeding movement between the rotating cutter and the work piece parallel to said surface, said cutter having a plurality of teeth each with a main cutting edge disposed at a bevel angle to the plane of rotation of the cutter, the beveled edge of each tooth acting at an effective shear angle of more than fifteen degrees and being positioned with the end adjacent the finished work surface during operation of the cutter leading its other end, and finishing edges on said teeth acting to smooth off the zone of the work machined by said main edges.

6. A milling cutter comprising a rotary body and a plurality of teeth projecting therefrom and having edges defining a cutting face parallel to the plane of rotation of the cutter and other edges defining a frusto-conical cutting face, the surface of said body projecting beyond the base of said frusto-conical face whereby to support said teeth close to said first edges.

7. A milling cutter for removing a layer of metal from a work piece to form a smooth finished surface thereon by relative feeding movement between the rotating cutter and the work piece parallel to said surface, said cutter having a rotary body and a plurality of teeth projecting therefrom and having edges movable along said finished surface during operation of the cutter and other edges defining a generally frusto-conical cutting face, said teeth projecting beyond said body a distance less than the height of said frusto-conical face.

8. A face milling cutter adapted to form a plane surface on a work piece when rotated and relatively fed parallel to said surface, said cutter comprising a rotary body and a plurality of teeth projecting therefrom and each having a main cutting edge disposed at a bevel angle to the plane of rotation of the cutter and a finishing edge operable to smooth off the zone of the work machined by the main edge, each tooth being positioned relative to the cutter axis so that the beveled cutting edge acts on the work at an effective shear angle of such magnitude and sign as to produce a component of the tangential force on such edge counteracting the major portion of the end thrust on the cutter due to the bevel of the edge.

9. A face milling cutter comprising a rotary body and a plurality of teeth having end edges defining an end cutting face parallel to the plane of rotation of the cutter and side edges defining a generally frusto-conical cutting face, the end face of said body projecting beyond the base of said frusto-conical face, said end and side edges being spaced from said body distances less than the axial height of said conical face, and said side edges having an effective shear angle of proper sign and sufficient magnitude to cause the chips formed by said side edges to be thrown outwardly away from and clear of said body.

10. A multiple blade cutter for removing a layer of metal from a work piece to form a smooth finished surface thereon by relative feeding movement between the cutter and the work piece parallel to said surface, said cutter comprising a rotary body, blades projecting therefrom and each having a finishing cutting edge movable along said finished surface during operation of the cutter, and main cutting edges disposed at a bevel angle to said first edges, the cutting faces of said blades being positioned at an apparent rake angle of negative sign and at a shear angle both related with each other and correlated in magnitude to the amount of said bevel angle so that the rake and shear angles effective on said main edges during operation of the cutter are of positive sign and magnitudes suited for efficient cutting of predetermined metal.

11. A cutter for removing a layer of metal from predetermined work material during relative feeding movement between the rotating cutter and a work piece along the surface to be produced, said cutter having a rotary body and teeth thereon each having a cutting edge determining the finished work surface during operation of the cutter and an adjacent main cutting edge disposed at a bevel angle to said finishing edge, the cutting face on each tooth being positioned at an apparent rake angle of negative sign and at a shear angle both related to each other in magnitude and to said bevel angle to cause said main edge to act on the work at an effective rake angle of positive sign and of sufficient magnitude to suit the known cutting characteristics of said work material.

12. A cutter for removing a surface layer of predetermined metal from a work piece to form a smooth surface thereon by relative feeding movement between the rotating cutter and the work piece parallel to said surface, said cutter comprising a rotary body, teeth projecting from said body and having cutting faces each disposed at an apparent rake angle of negative sign and at an apparent shear angle, main cutting edges on said teeth each disposed relative to said work surface at an acute bevel angle coacting with said apparent angles to convert the rake angle into a positive angle effective on the bevel edge during operation of the cutter and having sufficient magnitude to suit the known cutting characteristics of said metal, and secondary cutting edges on said teeth acting during operation of the cutter to smooth off the zone of the work machined by said main edges.

13. A cutter for removing a layer of metal from a work piece to form a smooth finished surface thereon by relative feeding movement between the rotating cutter and the work piece parallel to said surface, said cutter comprising a rotary body and teeth thereon having main cutting edges disposed at a bevel angle to the finished work surface and cutting faces positioned at an apparent rake angle of negatve sign and at a shear angle coacting with each other and with the bevel angle to define a rake angle of positive sign effective on the bevel edges during operation of the cutter, and finishing cutting edges on said teeth acting during operation of the cutter to smooth off the zone of the work machined by said main edges.

14. A cutter for removing a layer of predetermined metal from a work piece to form a smooth finished surface thereon by relative feeding movement between the rotating cutter and the work piece parallel to said surface, said cutter comprising a rotary body, an annular series of teeth projecting from said body and each having a main cutting edge inclined at a bevel angle to the work surface formed by operation of the cutter, and a second edge determining said finished work surface, the cutting faces of said teeth being positioned at a negative apparent rake angle and a shear angle acting conjointly with said bevel angle to produce positive rake and shear angles effective on said bevel edges during operation of the cutter and of magnitudes at least sufficient to cause efficient cutting of said metal.

15. A cutter for removing a layer of predetermined metal from a work piece to form a smooth finished surface thereon by relative feeding movement between the rotating cutter and the work piece parallel to said surface, said cutter comprising a rotary body, teeth projecting from said body and each having a main cutting edge disposed at a bevel angle to the work surface formed during operation of the cutter, a second edge adapted to smooth off the work zone machined by the main edges, and a cutting face on each tooth positioned at an apparent rake angle of negative sign and at a shear angle of related magnitude coacting with said bevel angle to cause said edges to act on the work at effective rake and shear angles of positive sign and of magnitudes sufficiently large for efficient cutting of said metal and to cause the chips to be thrown away from and ahead of said cutter body during operation of the cutter.

16. A cutter for removing a layer of given work material from a work piece by relative movement between the rotating cutter and the work piece along the finished surface to be formed, said cutter comprising a rotary body, an annular series of teeth projecting from said body, main cutting edges of material of known cutting characteristics formed on said teeth at a bevel angle relative to the work surface formed by operation of the cutter with the end of each edge adjacent said work surface leading the other end during rotation of said body, and secondary cutting edges on said teeth for finishing the zone of the work machined by said main edges, the cutting face of each tooth being positioned at a negative apparent rake angle and a shear angle acting conjointly with said bevel angle to cause cutting engagement between said main edges and the work at a positive effective rake angle sufficiently large for efficient cutting of said work material and at an effective shear angle of sufficient size to cause the formation of spiral-helical chips during operation of the cutter and flow of such chips away from said body.

17. A cutter comprising a rotary body, teeth projecting therefrom, main cutting edges on said teeth each disposed at an acute bevel angle to the finished work surface formed during operation of the cutter and coacting to define a frusto-conical cutting face, second cutting edges on said teeth determining said finished work surface and spaced from said body a distance less than the effective height of said frusto-conical face, and cutting faces on said teeth positioned at an apparent rake angle of negative sign and at a shear angle of related magnitude both coacting with said bevel angle to cause said main edges to act on the work at a positive effective rake angle and a positive shear angle of sufficient magnitude to cause the chips to be thrown away from and ahead of said cutter body and to cause counteraction of a substantial portion of the thrust exerted on the cutter during operation thereof and due to said bevel angle.

18. A cutter having a rotary body, an annular series of teeth projecting from said body, main cutting edges on said teeth inclined at a bevel angle relative to the work surface formed by operation of the cutter with the end of each edge adjacent such surface leading the other end during rotation of said body, and second cutting edges on said teeth operable to smooth off the zone of the work machined by said main edges, the cutting face of each tooth being positioned at a negative apparent rake angle and a shear angle both coacting with said bevel angle to cause cutting engagement between said main edges and the work at a positive effective rake angle and at a shear angle sufficiently large to produce a force on said body during operation of the cutter counteracting the major portion of the thrust exerted on said body due to said bevel angle.

19. A cutter for removing a layer of material from a work piece by relative movement between the rotating cutter and the work piece along the finished surface to be formed, said cutter comprising a rotary body, an annular series of teeth projecting from said body, main cutting edges on said teeth disposed at a bevel angle relative to the work surface formed by operation of the cutter with the end of each edge adjacent said work surface leading the other end during rotation of said body, the cutting face of each tooth being positioned at a negative apparent rake angle and a positive apparent shear angle coacting to cause cutting engagement between the work and said main edges at a positive effective rake angle sufficiently large for efficient cutting of said work material and at a positive effective shear angle, and second cutting edges on said teeth for finishing the zone of the work machined by said main edges and acting on the work at positive rake and shear angles corresponding in magnitude to said apparent shear and rake angles respectively.

CHARLES E. KRAUS.

CERTIFICATE OF CORRECTION.

Patent No. 2,186,417. January 9, 1940.

CHARLES E. KRAUS.

It is hereby certified that error appears in the printed specification of the above numbered patent requiring correction as follows: Page 3, first column, line 59, for the word "filling" read milling; line 63, for "edge" read face; and second column, line 35, for "surface 2" read surface 29; and that the said Letters Patent should be read with this correction therein that the same may conform to the record of the case in the Patent Office.

Signed and sealed this 5th day of March, A. D. 1940.

(Seal)

Henry Van Arsdale,
Acting Commissioner of Patents.